United States Patent
Yao et al.

(10) Patent No.: US 9,122,102 B2
(45) Date of Patent: Sep. 1, 2015

(54) PATTERNED VERTICAL ALIGNMENT PIXEL ELECTRODE

(75) Inventors: Xiaohui Yao, Shenzhen (CN); Jehao Hsu, Shenzhen (CN); Jing-feng Xue, Shenzhen (CN); Chengcai Dong, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 143 days.

(21) Appl. No.: 13/512,577

(22) PCT Filed: Mar. 13, 2012

(86) PCT No.: PCT/CN2012/072220
§ 371 (c)(1),
(2), (4) Date: May 29, 2012

(87) PCT Pub. No.: WO2013/131285
PCT Pub. Date: Sep. 12, 2013

(65) Prior Publication Data
US 2013/0235317 A1    Sep. 12, 2013

(30) Foreign Application Priority Data
Mar. 9, 2012   (CN) .......................... 2012 1 0061732

(51) Int. Cl.
G02F 1/1337   (2006.01)
G02F 1/1343   (2006.01)

(52) U.S. Cl.
CPC .... *G02F 1/133707* (2013.01); *G02F 1/134336* (2013.01); *G02F 2001/133761* (2013.01); *G02F 2001/134318* (2013.01)

(58) Field of Classification Search
CPC .................................................. G02F 1/133707
USPC .................................................. 349/129–130
See application file for complete search history.

(56) References Cited

FOREIGN PATENT DOCUMENTS

CN      101968582    *   2/2011

* cited by examiner

*Primary Examiner* — Dung Nguyen

(57) ABSTRACT

A patterned vertical alignment (PVA) pixel electrode is disclosed. The PVA pixel electrode includes a first electrode and a second electrode. The first and second electrodes form a pre-tilt angle with respect to a periphery of the pixel. By disposing unequal lengths of indium-tin oxide (ITO) gaps at a periphery of the first and second electrodes, a distance between the first and second electrodes gradually becomes shortened from the center of the pixel outwards. The ITO gaps which are disposed at the periphery of a thin film transistor (TFT)-array substrate and/or a color filter (CF) are adjusted for eliminating a fringe field effect in the present invention, which a transmittance on the pixel regions is improved and an effect of image display quality is enhanced.

4 Claims, 5 Drawing Sheets

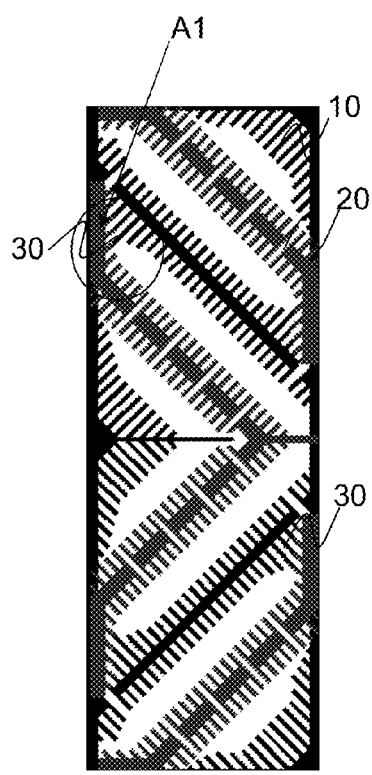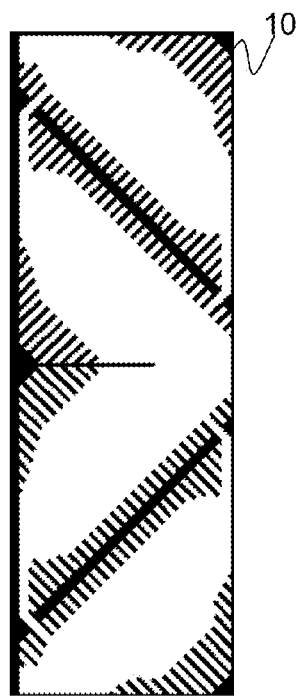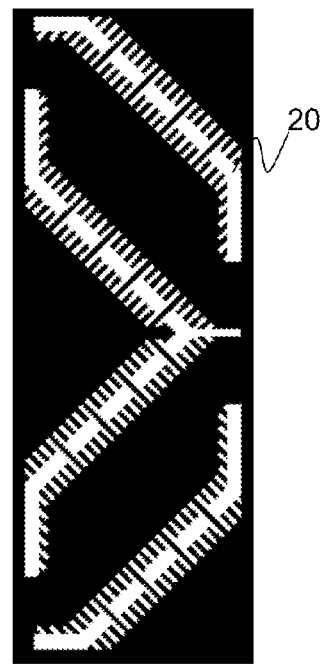
Fig. 2A        Fig. 2B        Fig. 2C
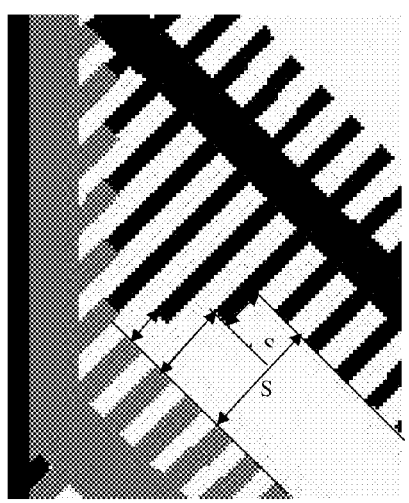
Fig. 2D

PATTERNED VERTICAL ALIGNMENT PIXEL ELECTRODE

BACKGROUND OF THE INVENTION

1. Field of the Invention

The present invention relates to a liquid crystal display (LCD) technology, and more particularly, to a patterned vertical alignment (PVA) pixel electrode which can improve transmittance on pixel regions and enhance image display quality.

2. Description of the Prior Art

Patterned vertical alignment (PVA) is one of liquid crystal (LC) vertical alignment (VA) modes. Patterns of a thin film transistor (TFT) and a color filter (CF) form electric fields. The electric fields control an alignment of LCs. Thus, a standard polyimide rubbing technique can be omitted.

Referring to FIGS. 1A and 1B, FIGS. 1A and 1B show a conventional PVA pixel. FIG. 1A shows a schematic diagram of a structure of a first electrode 10 which is disposed on a TFT-array substrate in the conventional PVA pixel electrode. FIG. 1B shows a schematic diagram of a second electrode 20 which is reversely disposed on a color filter (CF) in the conventional PVA pixel electrode. The periphery of the conventional PVA pixel electrode is different from the inside thereof because of the structure of the conventional PVA pixel electrode. A distribution of the electric fields at the periphery of the pixel is different from that in the inside of the pixel, resulting in a fringe field effect on the LCs and disclination of LCs at the periphery of the electrodes disposed on the TFT-array substrate and the CF. Accordingly, a display quality of images is degraded and the aperture ratio of the pixel is decreased. Referring to FIG. 5A, the disclination is generated on the LCs in the highlighted areas due to the fringe field effect. So dark lines appear in the pixel, transmittance on pixel regions is lowered, and the display quality of images is degraded.

Therefore, there is a need for a PVA pixel electrode for solving problems occurring in the conventional technology.

SUMMARY OF THE INVENTION

Accordingly, the present invention has been made to solve the above-mentioned problems occurring in the conventional technology, and an aspect of the present invention is to provide a PVA pixel electrode in which indium-tin oxide (ITO) gaps disposed at the periphery of the TFT-array substrate and at the periphery of the CF are adjusted for eliminating the fringe field effect on the LCs so as to enhance the transmittance on pixel regions and the display quality of pixels.

According to the present invention, a PVA pixel electrode comprises: a first electrode, disposed on a thin film transistor (TFT)-array substrate; and a second electrode, disposed on a color filter (CF) and corresponding to the first electrode, an alignment of LCs between the first and second electrodes being determined by electric fields formed between the first and second electrodes, the first and second electrodes forming a pre-tilt angle with respect to a periphery of the pixel, and unequal lengths of ITO gaps are disposed at the periphery between the first electrode and the second electrode, and a distance between the first and second electrodes gradually becomes shortened from the center of the pixel outwards.

According to the present invention, a PVA pixel electrode comprises: a first electrode, disposed on a TFT-array substrate; and a second electrode, disposed on a CF and corresponds to the first electrode, an alignment of LCs between the first and second electrodes is determined by electric fields produced between the first and second electrodes, the first and second electrodes form a pre-tilt angle with respect to a periphery of the pixel, and unequal lengths of ITO gaps are disposed on the second electrode at the periphery of the first and second electrodes, and a distance between the first and second electrodes gradually becomes shortened from the center of the pixel outwards.

According to the present invention, a PVA pixel electrode comprises: a first electrode, disposed on a TFT-array substrate; and a second electrode, disposed on a CF and corresponding to the first electrode, an alignment of LCs between the first and second electrodes being determined by electric fields produced between the first and second electrodes, the first and second electrodes forming a pre-tilt angle with respect to the periphery of the pixel, unequal lengths of ITO gaps are disposed on the first and second electrodes at the periphery of the first and second electrodes, and a distance between the first and second electrodes gradually becomes shortened from the center of the pixel outwards.

In one aspect of the present invention, the distance between the first electrode and the second electrode is set as S, a difference between neighboring distances S is set as $\Delta$ S, and the $\Delta$ S at first increases and then decreases from the center of the pixel outwards.

In yet another aspect of the present invention, an alignment of the $\Delta$ S remains the same from the center of the pixel outwards.

In yet another aspect of the present invention, the lengths of neighboring ITO gaps which are disposed on the first electrode vary from 1 um to 10 um.

In still another aspect of the present invention, the lengths of neighboring ITO gaps which are disposed on the second electrode vary from 1 um to 10 um.

Contrast to the conventional technology providing the PVA pixel electrode with the low display quality of images and the low aperture ratio of the pixel due to the fringe field effect occurring in the LCs, the present invention provides the PVA pixel electrode in which the ITO gaps disposed at the periphery of the TFT-array substrate and at the periphery of the CF are adjusted for eliminating the fringe field effect so as to enhance the transmittance on the pixel regions and the display quality of images.

These and other features, aspects and advantages of the present disclosure will become understood with reference to the following description, appended claims and accompanying figures.

BRIEF DESCRIPTION OF THE DRAWINGS

FIG. 2A shows a schematic diagram of a first electrode and a second electrode in the PVA pixel electrode.

FIG. 2B shows a schematic diagram of the first electrode disposed on a TFT-array substrate.

FIG. 2C shows a schematic diagram of the second electrode being reversely disposed on a CF.

FIG. 2D shows an enlarged diagram of A1 shown in FIG. 2A.

DETAILED DESCRIPTION OF THE PREFERRED EMBODIMENTS

Figure 1A:
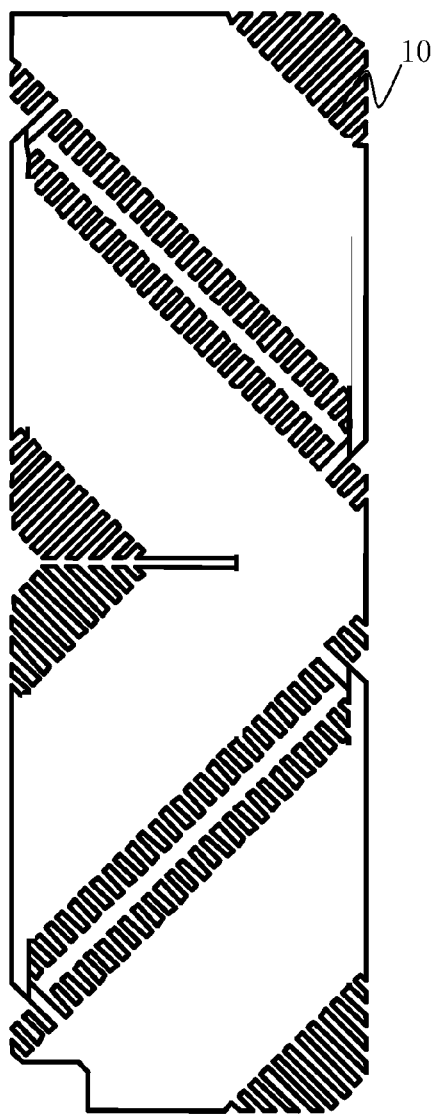
FIG. 1A shows a schematic diagram of a structure of a first electrode disposed on a TFT-array substrate in the conventional PVA pixel electrode.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

In the following description, the same elements will be designated by the same reference numerals although they are shown in different drawings.

Referring to FIGS. 2A, 2B, 2C, and 2D, a PVA pixel electrode according to a first preferred embodiment of the present invention is shown. FIG. 2A shows a schematic diagram of a first electrode 10 and a second electrode 20 in the PVA pixel electrode. FIG. 2B shows a schematic diagram of the first electrode 10 disposed on a TFT-array substrate. FIG. 2C shows a schematic diagram of the second electrode 20 which is reversely disposed on a CF. FIG. 2D shows an enlarged diagram of A1 shown in FIG. 2A. The PVA pixel electrode comprises the first electrode 10 and the second electrode 20. The first electrode 10 is disposed on the TFT-array substrate, and the second electrode 20 is disposed on the CF. An alignment of LCs between the first and second electrodes 10 and 20 is determined by electric fields formed between the first and second electrodes 10 and 20. The first and second electrodes 10 and 20 form a pre-tilt angle with respect to the periphery of the pixel. The first electrode 10 and the corresponding electrode 20 form eight domains of LC arrangements, as shown in FIG. 2A. Viewing angles of a liquid crystal display (LCD) can be improved through a continuous domain. Unequal lengths of ITO gaps 30 are disposed on the first electrode 10 at the periphery of the first and second electrodes 10 and 20 for the PVA pixel electrode. A distance between the first and second electrodes 10 and 20 gradually becomes shortened from the center of the pixel outwards.

Figure 1B:
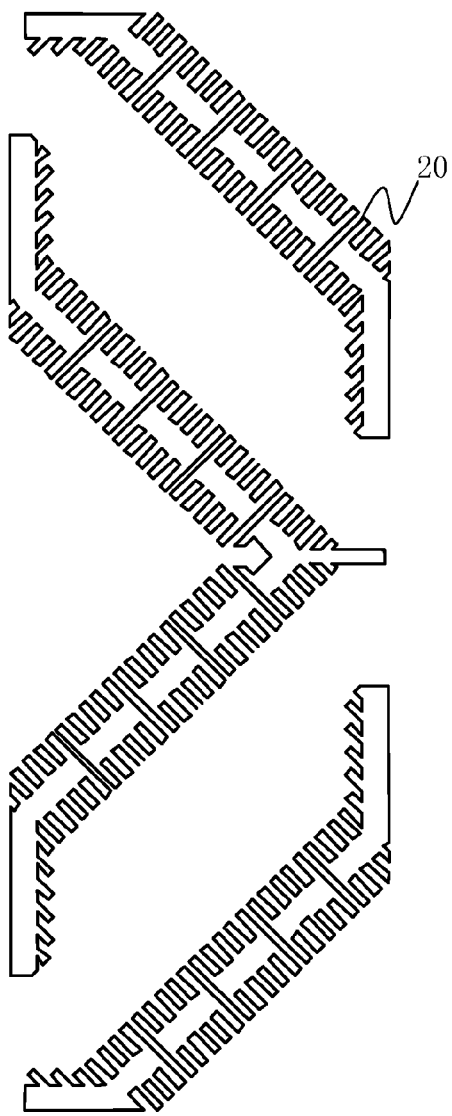
FIG. 1B shows a schematic diagram of a second electrode being reversely disposed on a color filter (CF) in the conventional PVA pixel electrode.
Figure 5A:
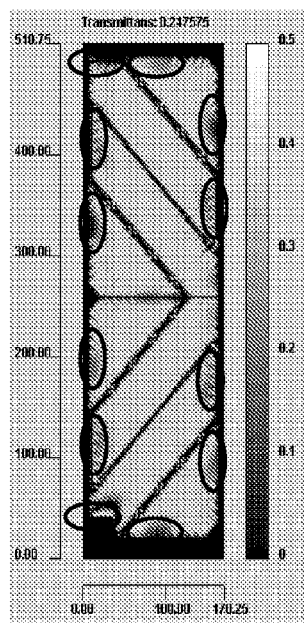
FIG. 5A shows a simulation diagram of output analog of the PVA pixel electrode in the conventional technology.

FIG. 2C is the same as FIG. 1B since only the first electrode 10 is modified in the first embodiment. FIG. 2B shows corresponding modifications of the first electrode 10 on the TFT-array substrate. Referring to FIG. 5A, the first electrode 10 in FIG. 2B is modified according to 12 highlighted areas. The unequal lengths of ITO gaps 30 are disposed at the periphery of the first and second electrodes 10 and 20. Thus, the distance between the first and second electrodes 10 and 20 gradually becomes shortened from the center of the pixel outwards. The lengths of neighboring ITO gaps 30 which are disposed on the first electrode 10 vary from 1 um to 10 um.

The distance between the first and second electrodes 10 and 20 is set as S in the first embodiment. A difference between neighboring distances S is set as ⊿ S. The ⊿ S varies optionally from the center of the pixel outwards. It is preferably that ⊿ S at first increases and then decreases. As shown in FIG. 2D, the distance S between the first and second electrodes 10 and 20 from the center of the pixel outwards is 20, 18, 14, 8, 5, 2, 1, and 0 (some of the ITO gaps 30 not being shown in FIG. 2D). Accordingly, ⊿ S is 2, 4, 6, 3, 1, and 1 from the center of the pixel outwards.

Figures 3A, 3B, 3C:
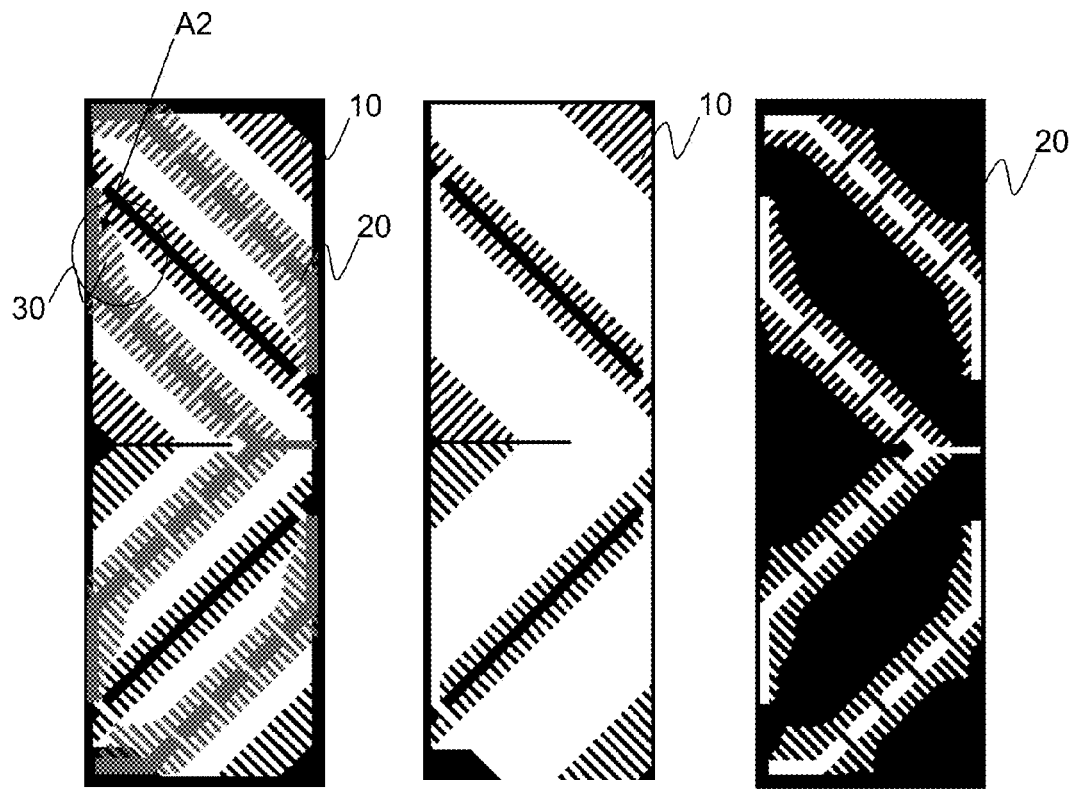
FIG. 3A shows a schematic diagram of a first electrode and a second electrode 20 in the PVA pixel electrode.
FIG. 3B shows a schematic diagram of the first electrode disposed on a TFT-array substrate.
FIG. 3C shows a schematic diagram of the second electrode being reversely disposed on a CF.
Figure 3D:
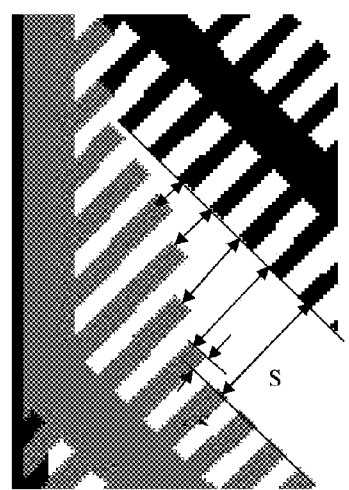
FIG. 3D shows an enlarged diagram of A2 shown in FIG. 3A.

Referring to FIGS. 3A, 3B, 3C, and 3D, a PVA pixel electrode according to a second preferred embodiment of the present invention is shown. FIG. 3A shows a schematic diagram of a first electrode 10 and a second electrode 20 in the PVA pixel electrode. FIG. 3B shows a schematic diagram of the first electrode 10 disposed on a TFT-array substrate. FIG. 3C shows a schematic diagram of the second electrode 20 which is reversely disposed on a CF. FIG. 3D shows an enlarged diagram of A2 shown in FIG. 3A. Differing from the first embodiment, unequal lengths of ITO gaps 30 are disposed on the second electrode 20 at the periphery of the first and second electrodes 10 and 20 in the second embodiment. A distance between the first and second electrodes 10 and 20 gradually becomes shortened from the center of the pixel outwards.

Only the second electrode 20 disposed on a CF is modified in the second embodiment, as shown in FIG. 3C. FIG. 3B showing a first electrode 10 disposed on the TFT-array substrate is identical to FIG. 1A. FIG. 3C shows corresponding modifications of the second electrode 20. Referring to FIG. 5A, the second electrode 20 in FIG. 3C is modified according to 12 highlighted areas. Unequal lengths of ITO gaps 30 are disposed at the periphery of the first and second electrodes 10 and 20. Thus, the distance between the first and second electrodes 10 and 20 gradually becomes shortened from the center of the pixel outwards. The lengths of neighboring ITO gaps which are disposed on the second electrode 20 vary from 1 um to 10 um.

The distance between the first and second electrodes 10 and 20 is set as S in the second embodiment. A difference between neighboring distances S is set as ⊿ S. The ⊿ S varies optionally from the center of the pixel outwards. It is preferably that ⊿ S at first increases and then decreases. As shown in FIG. 3D, the distance S between the first and second electrodes 10 and 20 from the center of the pixel outwards is 20, 18, 14, 8, 5, 2, 1, and 0 (some of the ITO gaps 30 not being shown in FIG. 3D). Accordingly, ⊿ S is 2, 4, 6, 3, 1, and 1 from the center of the pixel outwards.

Figures 4A, 4B, 4C:
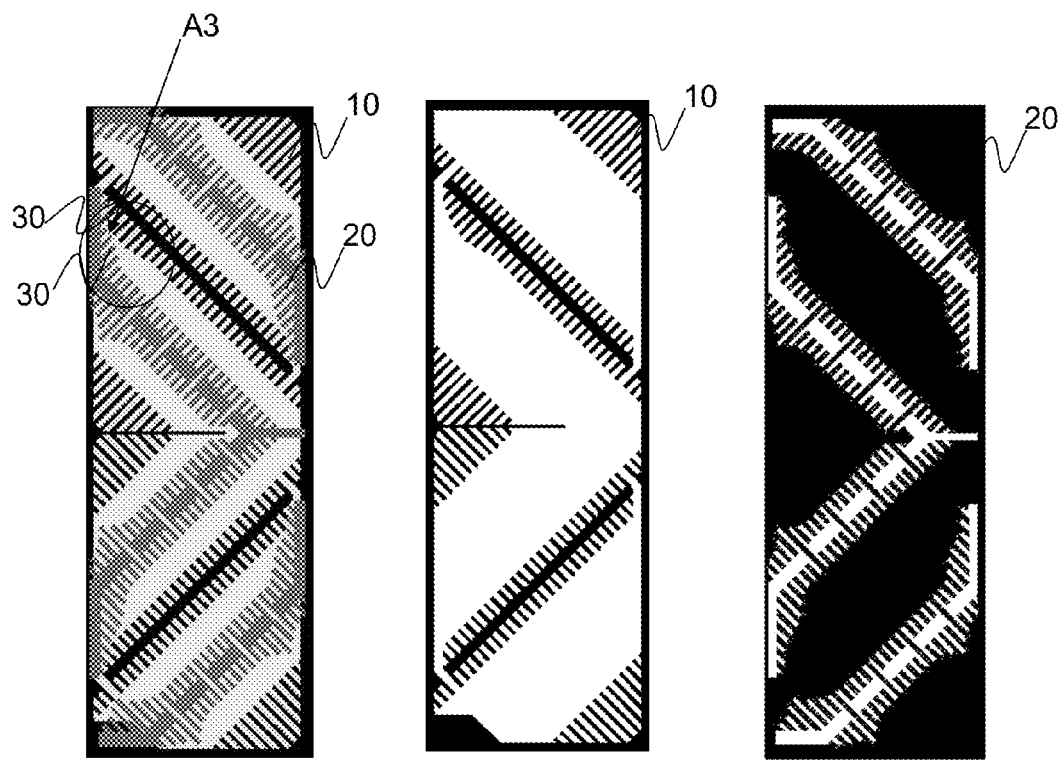
FIG. 4A shows a schematic diagram of a first electrode and a second electrode in the PVA pixel electrode.
FIG. 4B shows a schematic diagram of the first electrode disposed on a TFT-array substrate.
FIG. 4C shows a schematic diagram of the second electrode being reversely disposed on a CF.
Figure 4D:
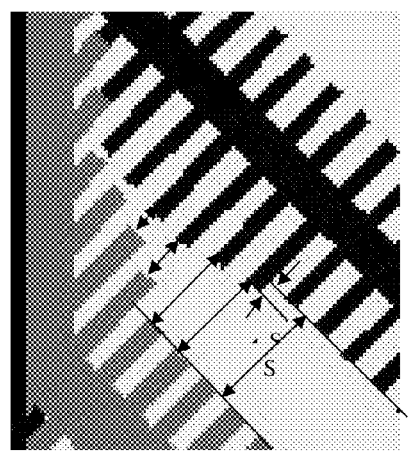
FIG. 4D shows an enlarged diagram of A3 shown in FIG. 4A.

Referring to FIGS. 4A, 4B, 4C, and 4D, a PVA pixel electrode according to a third preferred embodiment of the present invention is shown. FIG. 4A shows a schematic diagram of a first electrode 10 and a second electrode 20 in the PVA pixel electrode. FIG. 4B shows a schematic diagram of the first electrode 10 disposed on a TFT-array substrate. FIG. 4C shows a schematic diagram of the second electrode 20 which is reversely disposed on a CF. FIG. 4D shows an enlarged diagram of A3 shown in FIG. 4A. Differing from the first embodiment, unequal lengths of ITO gaps 30 are disposed on the first and second electrodes 10 and 20 at the periphery of the first and second electrodes 10 and 20 in the third embodiment. A distance between the first and second electrodes 10 and 20 gradually becomes shortened from the center of the pixel outwards.

The first and second electrodes 10 and 20 are modified in the third embodiment. The first electrode 10 disposed on the TFT-array substrate is modified, as shown in FIG. 4B. The second electrode 20 disposed on the CF is modified, as shown in FIG. 4C. Referring to FIG. 5A, the first electrode 10 in FIG. 4B and/or the second electrode 20 in FIG. 4C are modified according to 12 highlighted areas. The first and second electrodes 10 and 20 are modified especially in A3 shown in FIG. 4A. Unequal lengths of ITO gaps 30 are disposed at the periphery of the first and second electrodes 10 and 20. Thus, the distance between the first and second electrodes 10 and 20 gradually becomes shortened from the center of the pixel outwards. The lengths of neighboring ITO gaps which are disposed on the first and second electrodes 10 and 20 vary from 1 um to 10 um.

The distance between the first and second electrodes 10 and 20 is set as S in the third embodiment. A difference between neighboring distances S is set as ⊿ S. The ⊿ S varies optionally from the center of the pixel outwards. It is preferably that ⊿ S at first increases and then decreases. As shown in FIG. 4D, the distance S between the first and second electrodes 10 and 20 from the center of the pixel outwards is 20, 18, 14, 8, 5, 2, 1, and 0 (some of the ITO gaps 30 not being shown in FIG. 4D). Accordingly, ⊿ S is 2, 4, 6, 3, 1, and 1 from the center of the pixel outwards.

The ITO gaps 30 disposed on the first electrode 10 and/or the second electrode 20 at the periphery of the first and second electrodes 10 and 20 reduce the distance S between the first and second electrodes 10 and 20 at the periphery of the pixel, thereby eliminating the fringe field effect. The unequal lengths of ITO gaps 30 at the periphery of the first and second electrodes 10 and 20 change a distribution of the fringe field, resulting in a concordant alignment of the LCs at the periphery of the pixel and in the inside of the pixel and an effect of removing disclination. The lengths of neighboring ITO gaps 30 which are disposed on the first electrode 10 and/or the second electrode 20 should avoid being too large. The distance S between the first and second electrodes 10 and 20 is reduced outwards. Especially, the difference between neighboring distances S, ⊿ S, at first increases and then decreases. In this way, a smooth transition will be expected in the electric fields between the first and second electrodes 10 and 20 when removing the fringe field effect. It is unnecessary to worry about a mutation of the electric fields occurring in some of the electrodes due to the disposition of the ITO gaps 30. Therefore, it is sure that the effect on display is not affected. The ITO gaps 30 can be optionally disposed on the first electrode 10, on the second electrode 20, or on both of the first and second electrodes 10 and 20. The scope of the present invention includes that the ITO gaps 30 are disposed on the first and second electrodes 10 and 20 with the distance between the first and second electrodes 10 and 20 decreasing outwards. Positions of the ITO gaps 30 are not limited to the scope of the present invention. Moreover, it is preferred that the ITO gaps 30 are disposed on the second electrode 20 because the first electrode 10 on the TFT-array substrate has a variable potential while the second electrode 20 on the CF has a stable potential.

Figure 5B:
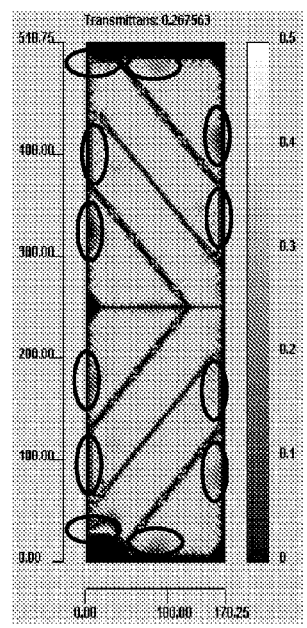
FIG. 5B shows a simulation diagram of output analog of the PVA pixel electrode according to the first preferred embodiment of the present invention.
Figure 5C:
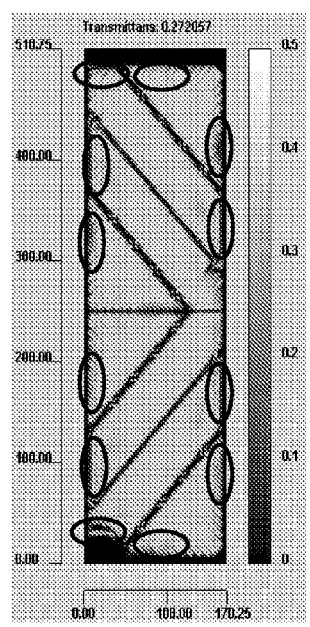
FIG. 5C shows a simulation diagram of output analog of the PVA pixel electrode according to the second preferred embodiment of the present invention.

FIG. 5A shows a simulation diagram of output analog of the PVA pixel electrode in the conventional technology. FIG. 5B shows a simulation diagram of output analog of the PVA pixel electrode according to the first preferred embodiment of the present invention. FIG. 5C shows a simulation diagram of output analog of the PVA pixel electrode according to the second preferred embodiment of the present invention. FIG. 5B shows an effect of removing disclination obtained from the first preferred embodiment. And FIG. 5C shows an effect of removing disclination obtained from the second preferred embodiment. Compared with the 12 highlighted areas shown in FIG. 5A, not only dark lines are reduced but also the aperture ratio of the pixel is increased by 8.07% in the 12 highlighted areas shown in FIG. 5B. Compared with the 12 highlighted areas shown in FIG. 5A, not only dark lines are reduced but also the aperture ratio of the pixel is increased by 9.89% in the 12 highlighted areas shown in FIG. 5C. A similar positive effect is also shown in the third preferred embodiment of the present invention.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A patterned vertical alignment (PVA pixel electrode, comprising:
   a first electrode, disposed on a thin film transistor (TFT)-array substrate; and
   a second electrode, disposed on a color filter (CF) and corresponding to the first electrode, an alignment of liquid crystals (LCs) between the first and second electrodes being determined by electric fields produced between the first and second electrodes, the first and second electrodes forming a pre-tilt angle with respect to the periphery of the pixel, wherein unequal lengths of indium-tin oxide (ITO) gaps are disposed on the first and second electrodes at the periphery of the first and second electrodes, and a distance between the first and second electrodes gradually becomes shortened from the center of the pixel outwards,
   wherein the lengths of neighboring ITO gaps which are disposed on the second electrode vary from 1 um to 10 um.

2. The PVA pixel electrode as claimed in claim 1, wherein the distance between the first electrode and the second electrode is set as S, the difference between neighboring distances S is set as ⊿ S, and the ⊿ S at first increases and then decreases from the center of the pixel outwards.

3. The PVA pixel electrode as claimed in claim 1, wherein an alignment of the ⊿ S remains the same from the center of the pixel outwards.

4. The PVA pixel electrode as claimed in claim 1, wherein the lengths of neighboring ITO gaps which are disposed on the first electrode vary from 1 um to 10 um.

* * * * *